(12) United States Patent
Horng et al.

(10) Patent No.: US 6,512,320 B2
(45) Date of Patent: *Jan. 28, 2003

(54) DIRECT CURRENT BRUSHLESS MOTOR STRUCTURE THAT CAN BE STARTED EASILY

(75) Inventors: Alex Horng, Kaohsiung (TW); Ching-Shen Hong, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/880,804

(22) Filed: Jun. 15, 2001

(65) Prior Publication Data

US 2002/0190600 A1 Dec. 19, 2002

(51) Int. Cl.[7] ................................................. H02K 7/00
(52) U.S. Cl. ..................... 310/259; 310/67 R; 310/216; 310/217; 310/218; 310/254
(58) Field of Search .............................. 310/67 R, 49 R, 310/216–218, 254–258; 360/99.08, 99.04, 97.08; 417/423.1–423.15

(56) References Cited

U.S. PATENT DOCUMENTS

| | | | | |
|---|---|---|---|---|
| 4,730,136 A | * | 3/1988 | Muller | 310/67 R |
| 4,775,813 A | * | 10/1988 | Janson | 310/257 |
| 4,804,873 A | * | 2/1989 | Shiraki et al. | 310/67 R |
| 4,823,038 A | * | 4/1989 | Mizutani et al. | 310/257 |
| 5,689,147 A | * | 11/1997 | Kaneda et al. | 310/216 |
| 5,744,893 A | * | 4/1998 | Zhao et al. | 310/259 |
| 5,808,390 A | * | 9/1998 | Miyazawa et al. | 310/194 |
| 5,859,487 A | * | 1/1999 | Chen | 310/254 |
| 5,923,110 A | * | 7/1999 | Zhao et al. | 310/67 R |
| 5,945,765 A | * | 8/1999 | Chen | 310/257 |
| 6,097,120 A | * | 8/2000 | Horng | 310/67 R |
| 6,285,108 B1 | * | 9/2001 | Horng | 310/259 |
| 6,384,505 B1 | * | 5/2002 | Horng et al. | 310/186 |

* cited by examiner

Primary Examiner—Tran Nguyen
(74) Attorney, Agent, or Firm—Bacon & Thomas

(57) ABSTRACT

A direct current brushless motor structure that can be started easily, includes a stator provided with a plurality of pole plates. Each pole plate has a pole face. Each pole face is located on the circumference of the same diameter of the center of the pole plate, to form an equally spaced annular arrangement with the permanent magnet of the rotor. Each pole face of the pole plate has at least one magnetic plate extended upward or downward, and the magnetic plates are arranged in an equally angular staggered manner.

2 Claims, 5 Drawing Sheets

DIRECT CURRENT BRUSHLESS MOTOR STRUCTURE THAT CAN BE STARTED EASILY

BACKGROUND OF THE INVENTION

1. Field of the Invention

The present invention relates to a direct current brushless motor structure that can be started easily, wherein the direct current brushless motor has a larger rotational torque, and can be started easily, without any rotational dead corner.

2. Description of the Related Art

A conventional direct current brushless motor in accordance with the prior art shown in FIG. 1 comprises a shaft tube 91 passed through a coil seat 90, an upper pole plate 92, and a lower pole plate 93. The rotation shaft 95 of the rotor 94 may be supported and rotated on the shaft tube 91. In the conventional direct current brushless motor, the pole faces of the upper pole plate 92 and the lower pole plate 93 are formed with cutouts 96 that are not located on the same circumference. Thus, when the pole faces are induced with the permanent magnet 97 of the rotor 94, an uneven magnetic force is produced, so that the rotor 94 is easily started, thereby efficiently solving the phenomenon of the dead corner during rotation of the rotor 94.

Referring to FIG. 2, in the conventional direct current brushless motor, the pole faces of the upper pole plate 92 and the lower pole plate 93 are formed with the cutouts 96 that are not located on the same circumference. Thus, a larger distance is formed between the cutouts 96 and the permanent magnet 97. Thus, the inducing effect between the upper pole plate 92, the lower pole plate 93, and the permanent magnet 97 is poor, thereby reducing the rotational 26 torque of the motor.

SUMMARY OF THE INVENTION

The primary objective of the present invention is to provide a direct current brushless motor structure that can be started easily. The pole face provided on the pole plate of the direct current brushless motor structure is located on the circumference of the same diameter of the center of the pole plate, to form a minimum equal distance with the permanent magnet, so that the rotor has a larger torque, and may form an uneven magnetic force, so that the motor can be started easily.

In accordance with the present invention, there is provided a direct current brushless motor structure that can be started easily, including a stator provided with a plurality of pole plates. Each pole plate has a pole face. Each pole face is located on the circumference of the same diameter of the center of the pole plate, to form an equally spaced annular arrangement with the permanent magnet of the rotor. Each pole face of the pole plate has at least one magnetic plate extended upward or downward, and the magnetic plates are arranged in an equally angular staggered manner.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
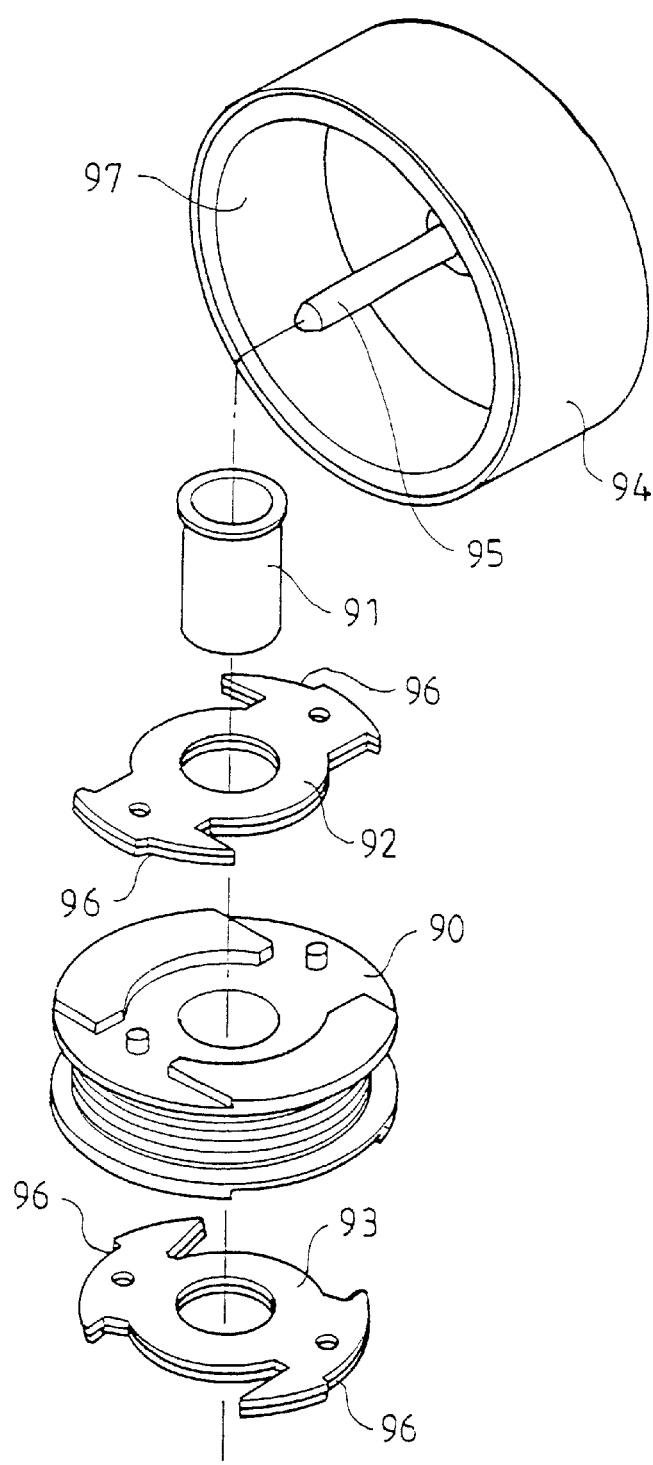
FIG. 1 is an exploded perspective view of a conventional direct current brushless motor in accordance with the prior art.
Figure 2:
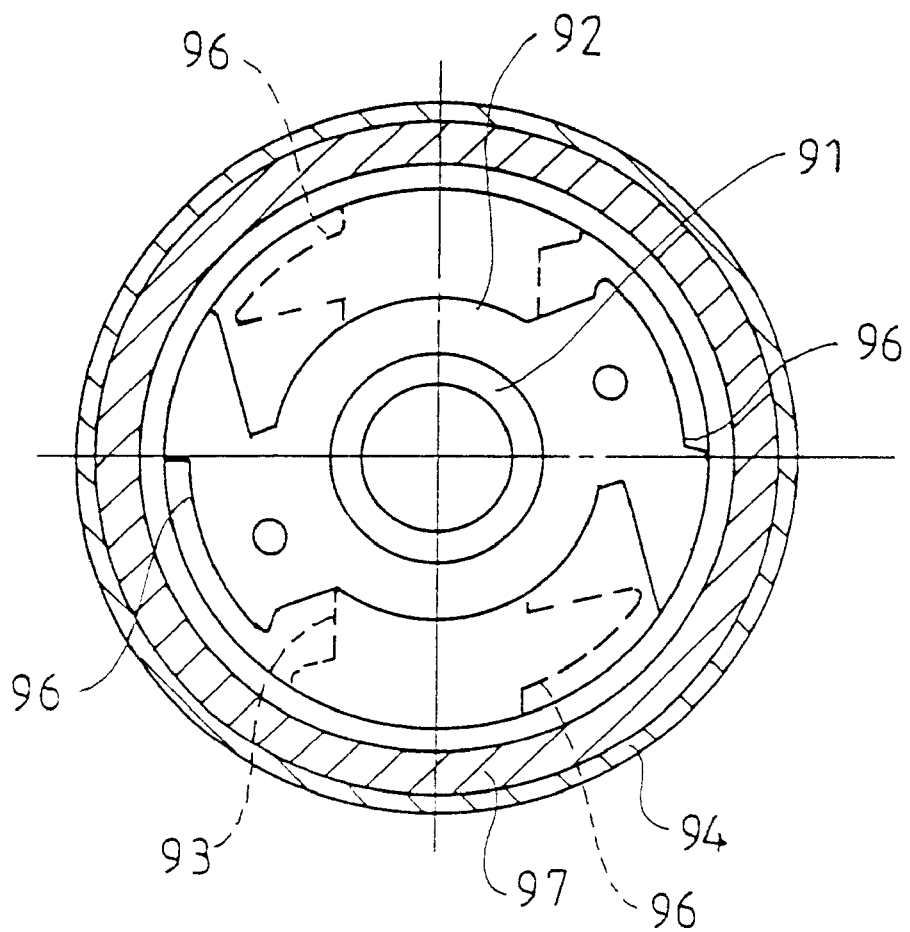
FIG. 2 is a cross-sectional assembly view of the conventional direct current brushless motor as shown in FIG. 1.
Figure 3:
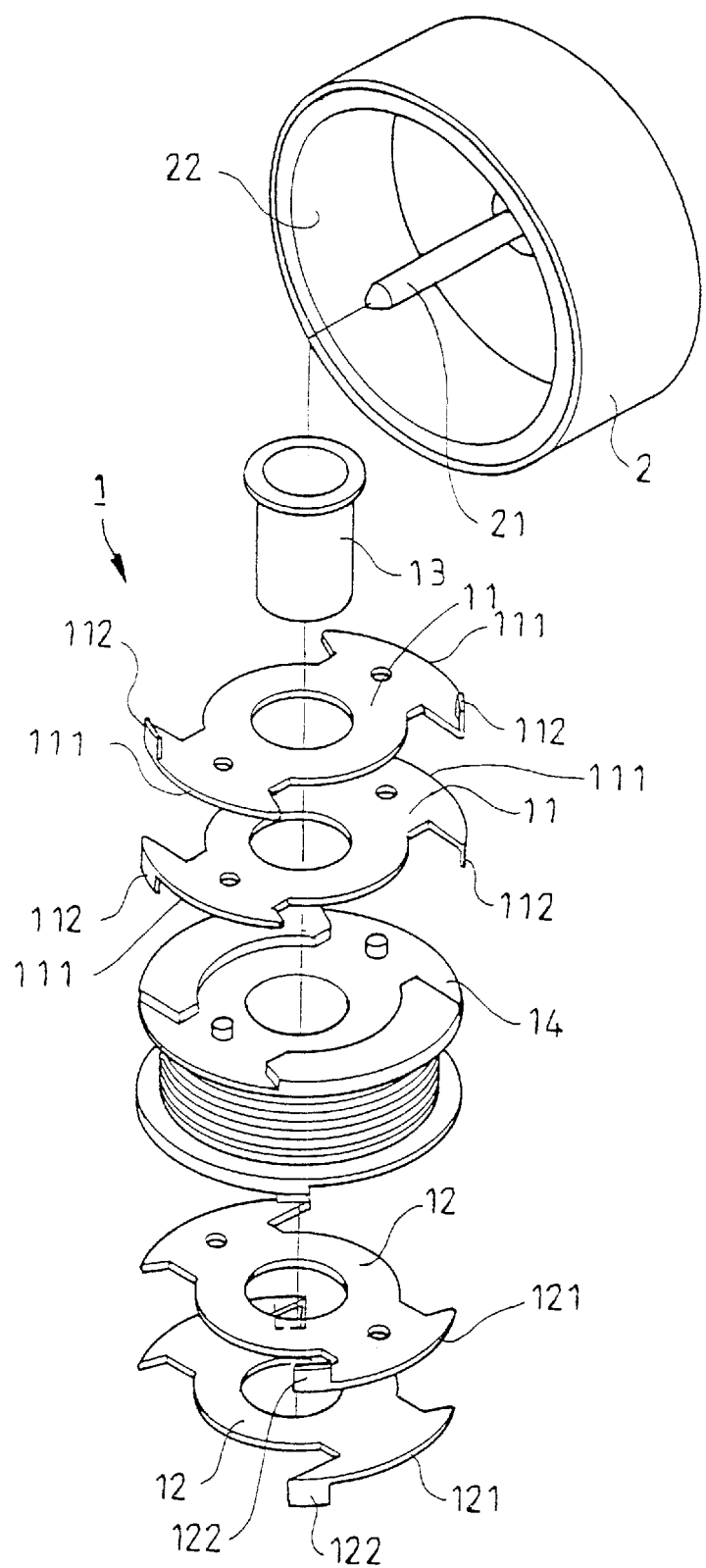
FIG. 3 is an exploded perspective view of a direct current brushless motor structure that can be started easily in accordance with a first embodiment of the present invention.

Referring to the drawings and initially to FIG. 3, a direct current brushless motor structure that can be started easily in accordance with a first embodiment of the present invention comprises a stator 1, and a rotor 2.

The stator 1 includes upper pole plates 11, lower pole plates 12, a shaft tube 13, and a coil seat 14. The shaft tube 13 passes through the upper pole plates 11 and the lower pole plates 12 which are fixed on the coil seat 14. The stator 1 includes at least one upper pole plate 11 and lower pole plate 12. The pole faces 111 and 121 of the upper pole plates 11 and the lower pole plates 12 are located on the circumference of the same diameter of the center of the upper pole plates 11 and the lower pole plates 12. The sides of the pole faces 111 and 121 are provided with at least one magnetic plate 112 and 122 extended and protruded upward or downward. The magnetic plates 112 and 122 of the upper pole plates 1 1 and the lower pole plates 12 are arranged in an equally angular staggered manner.

The rotor 2 includes a rotation shaft 21 that is pivoted on the shaft tube 13 of the stator 1 to rotate, and includes an annular permanent magnet 22 that may be mutually induced with the upper pole plates 11, the lower pole plates 12, and the magnetic plates 112 and 122 of the stator 1.

Figure 4:
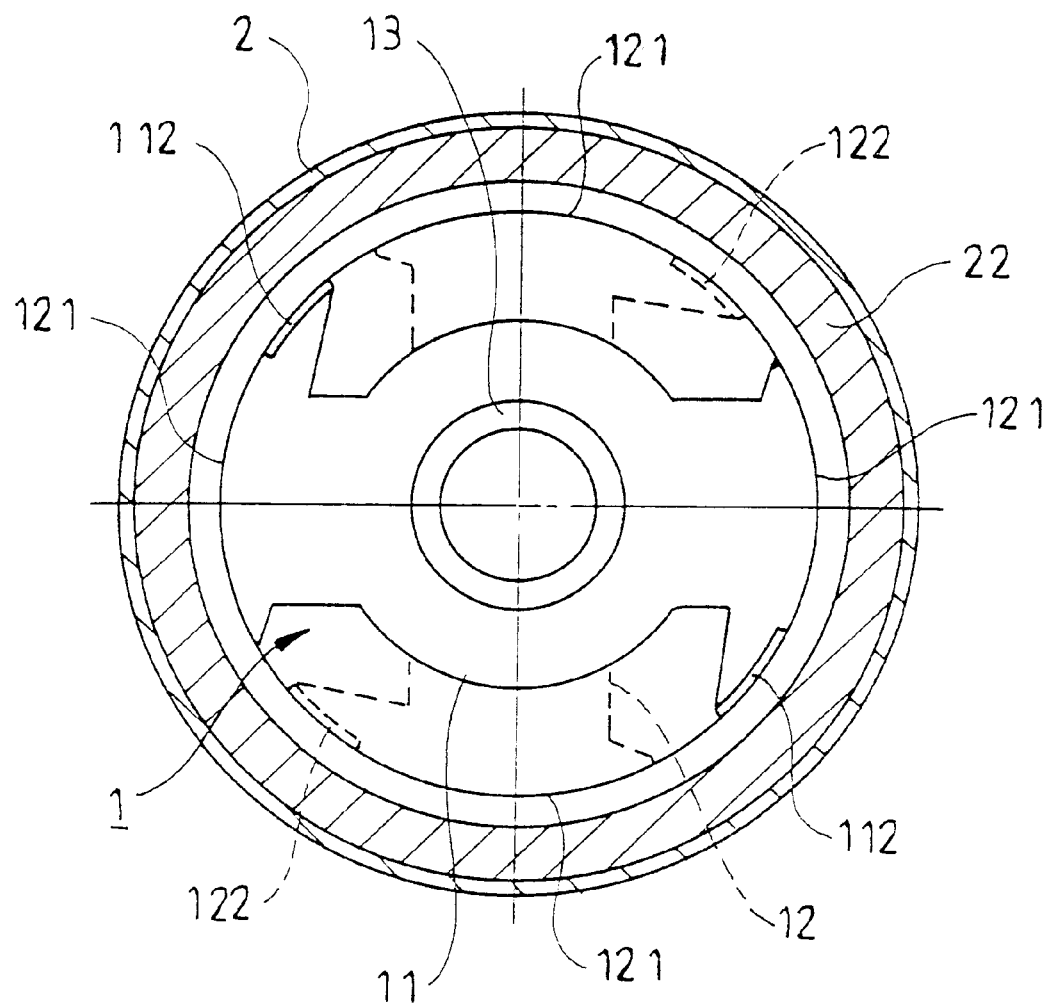
FIG. 4 is a cross-sectional assembly view of the direct current brushless motor structure that can be started easily as shown in FIG. 3.

Referring to FIG. 4, when the shaft tube 13 passes through the upper pole plates 11 and the lower pole plates 12 so that the upper pole plates 11 and the lower pole plates 12 are fixed on the coil seat 14, the pole faces 111 and 121 of the upper pole plates 21 and the lower pole plates 12 are located on the circumference of the same diameter of the center of the upper pole plates 11 and the lower pole plates 12. Thus, the pole faces 111 and 121, and the permanent magnet 22 of the rotor 2 form an annular arrangement with an equal distance therebetween. Each pole face 111 and 121 has a magnetic plate 112 and 122. Thus, when the upper pole plates 11 and the lower pole plates 12 of the stator 1 continuously change the polarity, the pole faces 111 and 121, cooperating with the permanent magnet 22 of the rotor 2 may force th rotate continuously by the principle of repellent of the same polarity. The pole faces 111 and 121 have protruding magnetic plates 112 and 122. Thus, the magnetic plates 112 and 122 may produce an uneven magnetic force, so that the rotor 2 will not have a rotational dead corner, that is, the rotor 2 can be started easily.

Figure 5:
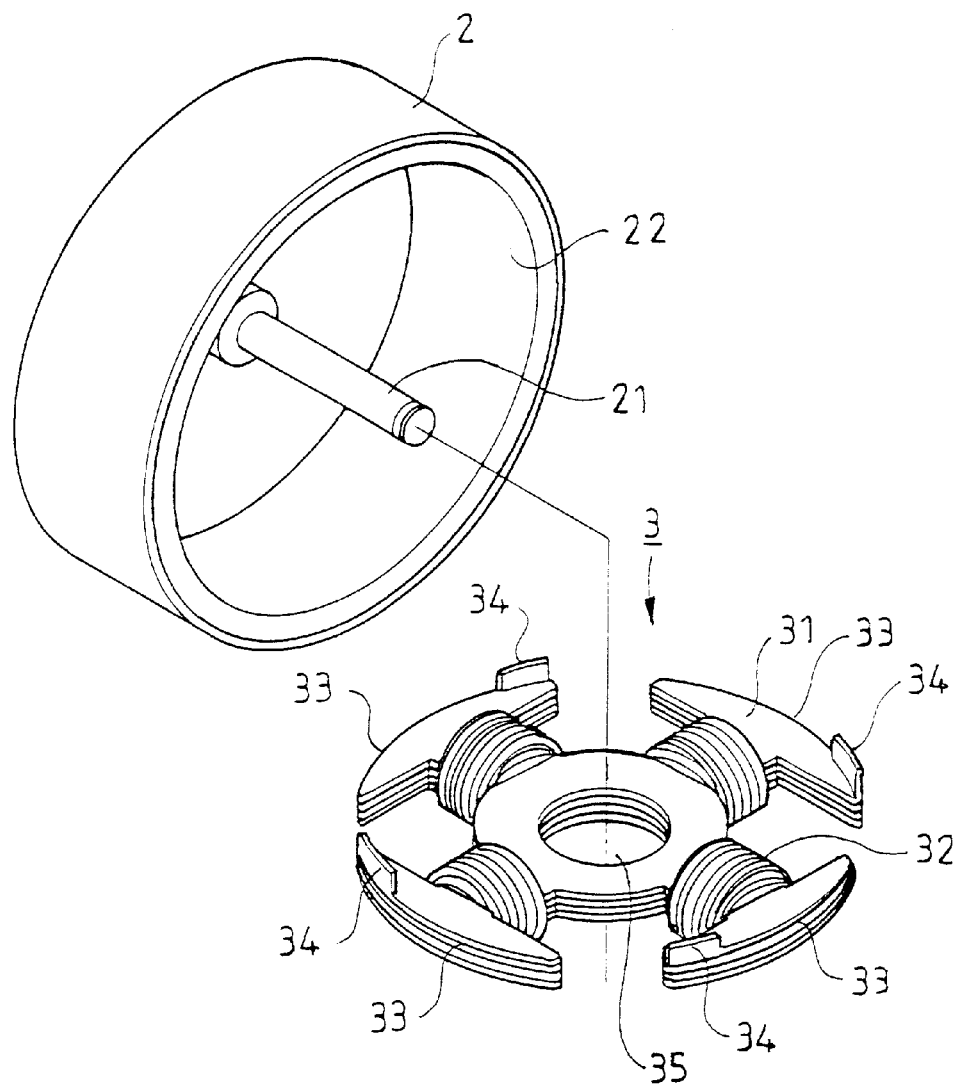
FIG. 5 is an exploded perspective view of a direct current brushless motor structure that can be started easily in accordance with a second embodiment of the present invention.

Referring to FIG. 5, in accordance with the preferred embodiment, the present invention is used in the direct current brushless motor of radial winding. The stator 3 includes a plurality of pole plates 31 laminated with each other, and the pole column of each pole plate 31 is wound with a coil 32. The distal end of each pole column of the pole plate 31 has a pole face 33. The pole faces 33 are located on the circumference of the same diameter of the center of the pole plates 31, and each pole face 33 is provided with at least one magnetic plate 34 extended and protruded upward or downward. The magnetic plates 34 are arranged in an equally angular staggered manner.

Thus, when the rotation shaft 21 of the rotor 2 is pivoted in the central hole 35 of the stator 3, the permanent magnet 22 of the rotor 2 and the pole faces 33 may form an annular arrangement with an equal distance therebetween. Thus, the direct current brushless motor in accordance with the present invention has the optimal inducing effect. Thus, the direct current brushless motor in accordance with the present invention has a larger torque. In addition, each pole plate 31 has a magnetic plate 34. Thus, when the pole plates 31 of the stator 1 continuously change the polarity, the poles of the pole faces 33, co-operating with the permanent magnet 22 of the rotor 2 may force the rotor 2 to rotate continuously by the principle of repellent of the same polarity. The pole faces 33 have protruding magnetic plates 34. Thus, the magnetic plates 34 may produce an uneven magnetic force, so that the rotor 2 can be started easily.

Accordingly, in the direct current brushless motor in accordance with the present invention, the pole faces and the permanent magnet of the rotor may form an annular arrangement with an equal distance therebetween. Thus, the pole faces and the permanent magnet of the rotor have the optimal inducing effect therebetween. Thus, the direct current brushless motor in accordance with the present invention has a larger torque. In addition, in the direct current brushless motor in accordance with the present invention, each pole face has a magnetic plate. Thus, the magnetic plates may produce an uneven magnetic force, so that the rotor can be started easily.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A direct current brushless motor structure that can be started easily, comprising:

a stator, including a shaft tube passed through a coil seat, upper pole plates and lower pole plates, each upper pole plate and lower pole plate having a pole face, the pole face located on a circumference of a same diameter of a center of the upper pole plates and the lower pole plates, each pole face of the upper pole plates and the lower pole plates provided with at least one magnetic plate extending in one of an upward direction and a downward direction, the magnetic plates being arranged in an equally angular staggered manner;

a rotor, including a rotation shaft pivoted on the shaft tube of the stator to rotate, the rotor including a permanent magnet equally spaced from each pole face of the upper pole plates and the lower pole plates of the stator.

2. A direct current brushless motor structure that can be started easily, comprising:

a stator, including a plurality of pole plates laminated with each other, a pole column of each pole plate being wound with a coil, a distal end of each pole column of the pole plate having a pole face, each pole face being located on a circumference of a same diameter of a center of the pole plate, each pole face having at least one magnetic plate extending in one of an upward direction and a downward direction, the magnetic plates arranged in an equally angular staggered manner;

a rotor, including a rotation shaft pivoted on a central hole of the stator to rotate, the rotor including a permanent magnet, the permanent magnet and each pole face of the stator forming an annular arrangement with an equal distance therebetween.

* * * * *